United States Patent
Kiyono et al.

(10) Patent No.: US 8,133,565 B2
(45) Date of Patent: Mar. 13, 2012

(54) RECORDING MEDIUM

(75) Inventors: Kenjirou Kiyono, Minato-ku (JP); Osamu Shouji, Yamato (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 433 days.

(21) Appl. No.: 12/304,479

(22) PCT Filed: Jun. 15, 2007

(86) PCT No.: PCT/JP2007/062127
§ 371 (c)(1),
(2), (4) Date: Mar. 31, 2009

(87) PCT Pub. No.: WO2007/145323
PCT Pub. Date: Dec. 21, 2007

(65) Prior Publication Data
US 2010/0067361 A1 Mar. 18, 2010

(30) Foreign Application Priority Data
Jun. 16, 2006 (JP) .................................. 2006-166970

(51) Int. Cl.
*B32B 3/02* (2006.01)
(52) U.S. Cl. ............... 428/64.1; 428/64.4; 428/64.5; 428/64.6; 430/270.12; 430/270.13
(58) Field of Classification Search .................. 428/64.4
See application file for complete search history.

(56) References Cited

U.S. PATENT DOCUMENTS

| | | |
|---|---|---|
| 6,071,588 A | 6/2000 | Nobumasa et al. |
| 2003/0064211 A1* | 4/2003 | Hirotsune et al. ............ 428/209 |
| 2003/0118772 A1 | 6/2003 | Hosoda et al. |
| 2005/0180303 A1* | 8/2005 | Shingai et al. ............ 369/275.2 |
| 2005/0233247 A1 | 10/2005 | Hosoda et al. |
| 2006/0120262 A1 | 6/2006 | Kiyono |
| 2009/0011169 A1 | 1/2009 | Fujii et al. |

FOREIGN PATENT DOCUMENTS

| | | |
|---|---|---|
| JP | 10-326434 | 12/1998 |
| JP | 2003-123315 | 4/2003 |
| JP | 2006 18981 | 1/2006 |
| JP | 2006-192885 | 7/2006 |
| TW | 472251 | 1/2002 |
| TW | 200416719 | 9/2004 |
| TW | 200511306 | 3/2005 |
| WO | 2006 0091070 | 1/2006 |

OTHER PUBLICATIONS

Taiwanese Office Action issued Dec. 2, 2010, in Patent Application No. 096121884 (with English-language translation).

* cited by examiner

*Primary Examiner* — Elizabeth Mulvaney
(74) *Attorney, Agent, or Firm* — Oblon, Spivak, McClelland, Maier & Neustadt, L.L.P.

(57) ABSTRACT

Provided is an optical recording medium comprising a substrate and a reflective layer, a first dielectric layer, a recording layer, a second dielectric layer and a light-transmission layer formed in this order on the substrate. The recording layer is decomposable by heat at a time of recording to achieve recording of the optical recording medium, and the optical recording medium further comprises a third dielectric layer between the second dielectric layer and the light-transmission layer.

17 Claims, 2 Drawing Sheets

RECORDING MEDIUM

TECHNICAL FIELD

The present invention relates to a recoding medium recordable by heating a recording layer. Particularly, the present invention relates to a write once type optical recording medium recordable by laser irradiation of the recording medium, wherein a recording layer contains a material that is decomposed at an arrival temperature of the recording layer by heating by the laser irradiation.

BACKGROUND ART

As a recording medium for recording information such as documents, sounds or images, a recording medium employing e.g. a magnetic material, a magneto-optical material, an organic dye material or a phase change material composed of an inorganic material, has been known.

In such a recording medium, a physical parameter of a recording layer such as refractive index, electric resistance, shape, volume or density, is changeable by applying an external factor to the recording layer by such a method as heating the recording layer by light irradiation or electric current through the recording layer or application of magnetic field to the recording layer. Further, in such a recording medium, usually, the difference of such a physical parameter between before and after the application of external factor to the recording layer is used for recording or reproducing an information.

As an example of such a recording medium, an optical recording medium recordable by irradiation of laser beam is mentioned. Such an optical recording medium is further roughly categorized into a write once type optical recording medium to which one time of recording is possible but rewriting is not possible, and a rewritable optical recording medium to which repeated recording is possible. Among these optical recording media, in recent years, a write once type optical recording medium is attentioned for such reasons that it is suitable for recording of e.g. a public document whose interpolation is not allowed, it is suitable for high speed recording, and it can reduce production cost.

For a recording layer of such a write once type optical recording medium, various types of constructions are proposed, which include one employing an organic compound, a phase change type employing an inorganic material, an alloy type or a perforation type. Among these, a construction disclosed in Patent Document 1 which has a thin recording layer containing an inorganic material discharging a gas so that the gas is discharged by heat of laser irradiation and deformation caused by the gas discharge is used for recording, is prospective for the reasons that it produces large signal amplitude and it has high irreversibility of preventing repeated recording.

According to Patent Document 1, by constructing a recording layer containing a material that is decomposed at an arrival temperature of the recording layer by heat at a time of recording, and a material undergoing no chemical reaction or phase change at the temperature, a write once type optical recording medium is obtained, which has a wide recording power range in which good recording signal characteristics is obtained.

Patent Document 1: JP-A-2006-18981

DISCLOSURE OF THE INVENTION

Problems to be Solved by the Invention

In recent years, in the above write once type optical recording medium, in order to record and/or reproduce large volume data of e.g. a moving picture of long time, development of write once type optical medium capable of achieving further high density recording of information than that of conventional method, is desired.

According to study of the present inventors, it has become clear that even if the technique described in the above Patent Document 1 is used to obtain a write once type optical recording medium capable of achieving further high density recording, a recording medium having sufficient performance particularly in preservation stability may not be obtained. Namely, when a material that is decomposed by heat of recording is employed for a recording layer, optical change and physical shape change of the recording layer occur at the same time to produce a large signal amplitude and good signal property, but if the physical shape change of the recording layer is too large, a local stress is formed in the deformed portion, which tends to cause exfoliation between layers in e.g. high temperature high humidity environment.

It is an object of the present invention to solve the above problems, and to realize a recording medium more excellent in preservation stability than those of conventional recording mediums. Particularly, it is an object of the present invention to provide a write once type optical recording medium which is required to have higher recording density than those of conventional write once type optical recording mediums, and which has both excellent preservation stability and good recording signal property.

Means for Solving the Problem

The present inventors have conducted extensive studies considering the above circumstances, and they have discovered that by forming two dielectric layers on a side of a recording layer opposite from a reflective layer, it becomes possible to provide a write once type optical recording medium capable of having both excellent preservation stability and good recording signal property, to complete the present invention.

Namely, the present invention provides an optical recording medium comprising a substrate and a reflective layer, a first dielectric layer, a recording layer, a second dielectric layer and a light-transmission layer formed in this order on the substrate, the recording layer being decomposable by heat at a time of recording to achieve recording of the optical recording medium, wherein the optical recording medium further comprises a third dielectric layer between the second dielectric layer and the light-transmission layer.

In the present invention, in a recording medium for carrying out recording of information by heating a recording layer, two dielectric layers are formed on a side of the recording layer opposite from a reflective layer. Specifically, besides an existing second dielectric layer, a third dielectric layer having a predetermined property is newly formed on a side of the second dielectric layer opposite from the recording layer, whereby it becomes possible to suppress physical shape change of the recording layer and to improve preservation stability.

Here, it is preferred that the hardness of the third dielectric layer is higher than the hardness of the second dielectric layer. By such a construction, it becomes possible to improve preservation stability of the recording medium.

Further, in the present invention, it is preferred that the refractive index of the third dielectric layer is lower than the refractive index of the second dielectric layer at a wavelength of light used for optical recording. By this construction, it is possible to maintain good uniformity of the recording medium in reflectivity.

Further, it is preferred that the recording layer comprises a material A that decomposes at an arrival temperature of the recording layer by heat at a time of recording; and a material B that undergoes chemical reaction at the arrival temperature of the recording layer by heat at the time of recording. By this construction, it becomes possible to obtain good recording signal property in a wide range of recording power even in a high density optical recording medium.

Further, it is preferred that the third dielectric layer contains an oxide of an element selected from the group consisting of Si, Y, Ce, Zr, Nb, Ta, Zn, Al, In and Sn; a nitride of an element selected from the group consisting of Si, Ge and Al; or a mixture of these. Particularly, it is preferred that the third dielectric layer contains a mixture of an oxide of Si and a nitride of Si.

Further, it is preferred that the hardness of the third dielectric layer is at least 8 GPa according to nano-indentation method. By employing a third dielectric layer having such a hardness, it becomes possible to realize good preservation stability.

Further, it is preferred that the difference between the refractive index of the third dielectric layer and the refractive index of the light-transmission layer is at most 0.5 at a wavelength of light to be used for optical recording. By such a construction, it is possible to maintain good uniformity of the recording medium in reflectivity.

The recording medium of the present invention may further comprise at least one layer selected from the group consisting of an antidiffusion layer, an underlayer, a protection coat layer and a close contact layer, and basically, the antidiffusion layer may be provided between the reflective layer and the first dielectric layer, the underlayer may be provided between the substrate and the reflective layer, the protection layer may be provided on the outermost surface side when the optical recording medium is a write once type optical recording medium of substrate side incident type, and the close contact layer may be provided between the recording layer and the first dielectric layer and/or the second dielectric layer.

Here, in the present invention, "chemical reaction" means a phenomenon that a material changes to a different material by an interaction with the material itself or with another material. Specifically, "a material B undergoes a chemical reaction" means that the material B is decomposed or the material B combines with another material. Here, "combine" means atoms of at least two types of elements are bonded with each other by chemical bonding force. Accordingly, "material B is combined" means that the material B is combined with e.g. atoms of other elements or another material.

Further, "phase" in a phase change means any one of solid phase, liquid phase and gas phase. Accordingly, "phase change" means change from one phase to the other phase in any two phases selected from solid phase, liquid phase and gas phase.

Further, "material" means a single element or a compound constituted by a plurality of elements, which has a characteristic that it usually forms a solid body at a normal temperature (25° C.) and normal humidity (50% RH).

Further, "decomposition" of a material means that "the material is changed to more simple materials of at least two types" when the material is compound constituted by a plurality of elements.

Effects of the Invention

The present invention can provide a write once type optical recording medium capable of having excellent preservation stability and good recording signal property.

EXPLANATION OF NUMERALS

Figure 1:
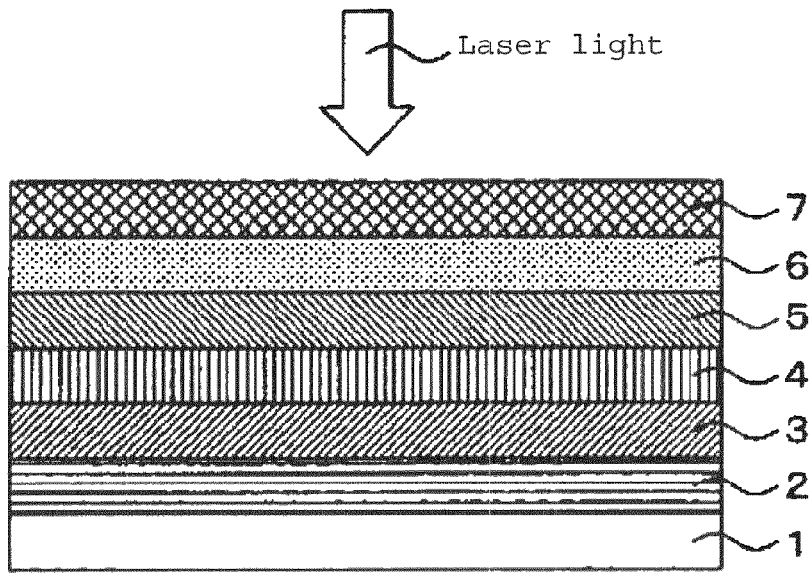
FIG. 1: An enlarged cross sectional view showing an example of the write once type optical recoding medium of the present invention.

1: Substrate
2: Reflective layer
3: First dielectric layer
4: Recording layer
5: Second dielectric layer
6: Third dielectric layer
7: Light transmission layer
8: Antidiffusion layer
9: Underlayer
10: Close contact layer
11: Protection coat layer

BEST MODE FOR CARRYING OUT THE INVENTION

From now, embodiments of the present invention will be described in detail, but it is a matter of course that the present invention is not limited to the following embodiments and can be modified to various embodiments to be carried out within a range of the gist of the present invention.

The recording medium of the present invention is characterized by comprising a substrate and a reflective layer, a first dielectric layer, a recording layer, a second dielectric layer and a light-transmission layer formed in this order on the substrate, the recording layer being configured to be decomposed by heat at a time of recording to achieve recording of the optical recording medium, wherein the optical recording medium further comprises a third dielectric layer between the second dielectric layer and the light-transmission layer.

A recording medium itself characterized by recording using decomposition of a recording layer by heat at a time of recording, has already been proposed as described above (for example, the recording medium disclosed by Patent Document 1).

In such a recording medium, physical parameters of a recording medium such as refractive index or shape are changed by heating the recording layer, and the differences of these physical parameters between before and after the change are used for recording or reproducing an information.

For heating the recording layer, there is e.g. a method of locally irradiating a recording medium with light and using heat generated by the radiation of light to heat the recording layer (for example, a method of irradiating laser light to heat a recording layer of a recording medium). Further, heating of the recording layer may be carried out by a method of locally applying a voltage to a recording medium, and using its Joule heat to heat the recording layer. The method for heating a recording layer is not particularly limited. By heating a recording layer, a material contained in the recording layer is decomposed at an arrival temperature of the recording layer so that a physical parameter value such as refractive index, electrical resistance, shape or density of the recording layer is changed.

When a material that is decomposed by heat at a time of recording is employed for a recording layer, optical change and physical shape change of the recording layer occur at the same time, to produce a large signal amplitude and good signal property. However, when the physical shape change of the recording layer is too large, local stress is formed in the deformed portion, which tends to cause exfoliation between layers in a high temperature high humidity environment, whereby preservation stability of the recording medium may be deteriorated.

[1] Properties of Second Dielectric Layer and Third Dielectric Layer Employed in the Present Invention The above physical shape change can be suppressed by providing a new dielectric layer having a predetermined characteristic in a conventional recording medium. Particularly, it is preferred to provide a dielectric layer made of a material having high hardness. Provision of such a new dielectric layer suppresses excess change of physical shape of the recording layer, prevents exfoliation between films, and improves preservation stability.

However, if the dielectric layer made of a material having high hardness is provided so as to directly contact with a recording layer, deformation of the recording layer at a time of recording is suppressed so radically, which tends to cause deterioration of recording property such as lowering of signal amplitude or lowering of recording sensitivity.

Further, even in a case of employing a material having relatively low hardness for a dielectric layer, by making the film thickness sufficiently large, it is possible to suppress physical shape change to improve preservation stability. However, if the film thickness is too thick, unevenness of film thickness causes unevenness of reflectivity, and thus, such a film is not practically usable.

For this reason, by providing a second dielectric layer having relatively low hardness on the recording layer to maintain recording signal property, and by further providing a third dielectric layer of an appropriate film thickness having relatively high hardness and low reflectivity on the second dielectric layer, it becomes possible to suppress excess deformation and to maintain preservation stability of recording signal without causing unevenness of reflectivity, such being preferred. Namely, by providing two dielectric layers, it becomes possible to achieve both good recording signal property and good preservation stability of recording signal at the same time.

The range of preferred hardness of the second dielectric layer in terms of nano-indentation hardness is from 2 GPa to 8 GPa, more preferably from 2.5 GPa to 7.5 GPa, the most preferably from 3 GPa to 7 GPa. If the hardness is within this range, good recording property can be obtained.

The range of preferred hardness of the third dielectric layer in terms of nano-indentation hardness is from 8 GPa to 30 GPa, more preferably from 9 GPa to 25 GPa, the most preferably from 10 GPa to 20 GPa. If the harness is within this range, good preservation stability of recording signal is obtained.

The nano-indentation hardness of the third dielectric layer is preferably at least 1.5 times the nano-indentation hardness of the second dielectric layer. Further, it is usually at most 10 times.

In the present invention, nano-indentation method was used as a method for measuring hardness. Microvickers hardness measurement method is commonly used for measuring hardness in many cases, but it is difficult for such a microvickers hardness measurement method to accurately measure the hardness of an inorganic material of at most 1 μm thick formed by sputtering. This is because the measurement is strongly affected by underlayer or because a crack tends to occur in such a thin film.

On the other hand, nano-indentation method is a method of pushing a microdiamond chip into a thin film and measuring the load and displacement during deformation accurately by using an AFM (Atomic Force Microscope) combined with the microdiamond. Since it is possible to measure the hardness even if the insertion depth of the diamond chip into the film is as small as tens of nanometers, it is possible to measure the hardness of thin film without having influence of substrate when the insertion depth into the thin film is set to about 1/10 of the film thickness.

The hardness based on nano-indentation method of the present invention was measured by preparing a sample of Si wafer on which a film of about 400 nm thick was formed by sputtering, determining a load producing an insertion depth of at most 40 nm into the sample by using a Triboscope manufactured by Hysitron, and carrying out measurement.

With respect to optical characteristics of the second and third dielectric layers, it is preferred that the third dielectric layer is made of a material having lower refractive index than that of the second dielectric layer. By changing the thicknesses of the second end third dielectric layers, the reflectivity of the medium is changed according to optical interference effect.

In general, it is difficult to make the film thickness of each layer in a medium strictly uniform for the reason of production, and unevenness of film thickness causes unevenness of reflectivity in the medium. In a material having low refractive index, the ratio of reflectivity change to film thickness change is small, and thus, employment of such material is effective to reduce unevenness of reflectivity.

However, the second dielectric layer in contact with the recording layer is required to have many functions such as low film stress, heat insulation property or low volume expansion coefficient by temperature besides hardness, and most of materials satisfying these functions, such as a mixture of ZnS and $SiO_2$ (refractive index 2.3), have a refractive index of from about 2.1 to 2.7.

Meanwhile, the third dielectric layer is mainly required to have hardness, and thus, selection of a material having appropriate refractive index is possible. Accordingly, the refractive index of the third dielectric layer is preferably at most 2.1, more preferably at most 1.9. When the refractive index is within this range, it is possible to maintain reflective index uniformity in a medium. Here, the lower limit of the refractive index of the third dielectric layer is not particularly limited, but is usually at least 1.3.

The refractive index of the third dielectric layer is preferably lower than the refractive index of the second dielectric layer, and the difference is preferably at least 0.3, more preferably at least 0.4.

Further, the difference between the refractive index of the third dielectric layer and the refractive index of a light transmission layer is preferably at most 0.5, more preferably at most 0.3. When the refractive index of the third dielectric layer is close to the refractive index of the light transmission layer, the effect of optical interference becomes small, and reflective index change due to film thickness change of the third dielectric layer becomes small, whereby good reflective index uniformity in the medium can be maintained.

Here, in the present invention, the measurement of the refractive index was carried out by preparing a sample of Si wafer on which a film of from 20 nm to 60 nm was formed and measuring the refractive index by using ellipsometry (polarization analysis).

The material of the third dielectric layer employed in the present invention is not particularly limited so long as it is a material having the above properties. Accordingly, the material can be selected from various types of materials according to design of entire recording medium such as the material of the recording layer, the second dielectric layer or the light transmission layer, and the film thickness of these layers. Preferred design of recording medium will be described in more detail in the example of write once type recording medium to be described later.

Here, a write once type optical recording medium is a preferred embodiment of the recording medium employed in the present invention. Accordingly, description regarding the present invention from now is not limited to application of the present invention to write once type optical media. Namely, it is a matter of course that the optical recording medium of the present invention can be applied to recording media other than write once type optical recording media.

[2] An Example of Embodiment of Write Once Type Optical Recording Medium

A write once type optical recording medium being a preferred embodiment of the present invention, is an optical recording medium comprising a substrate and at least a reflective layer, a first dielectric layer, a recording layer, a second dielectric layer, a third dielectric layer and a write transmission layer formed in this order on the substrate, wherein the recording layer is configured to be decomposed by heat at a time of recording, to carry out recording. From now, the layer structure of the write once type optical recording medium is described in detail with reference to specific examples, but the present invention is not limited to the following specific examples.

FIG. 1 is an enlarged cross sectional view showing an example of a write once type optical recording medium that can be employed in the present invention. As shown in FIG. 1, the write once type optical recording medium is constructed by comprising a substrate 1, and a reflective layer 2, a first dielectric layer 3, a recording layer 4, a second dielectric layer 5, a third dielectric layer 6 and a light transmission layer 7 laminated in this order on the substrate 1, wherein the write once type optical recording medium is configured to carry out recording and reproduction by making laser beam incident in the medium from the light transmission layer 7 side.

Figure 2:
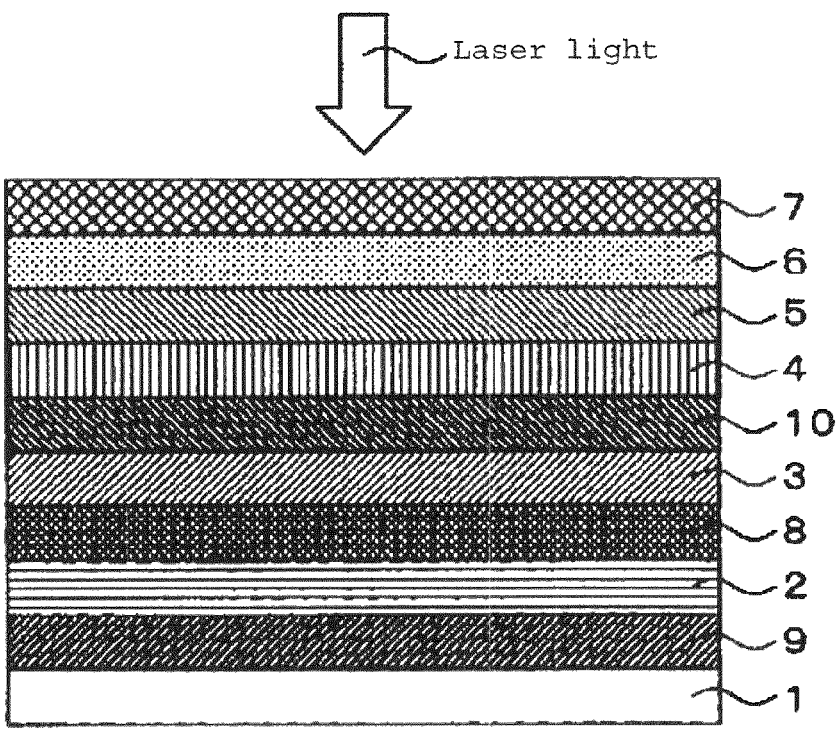
FIG. 2: An enlarged cross sectional view showing another example of the write once type optical recording medium of the present invention.
Figure 3:
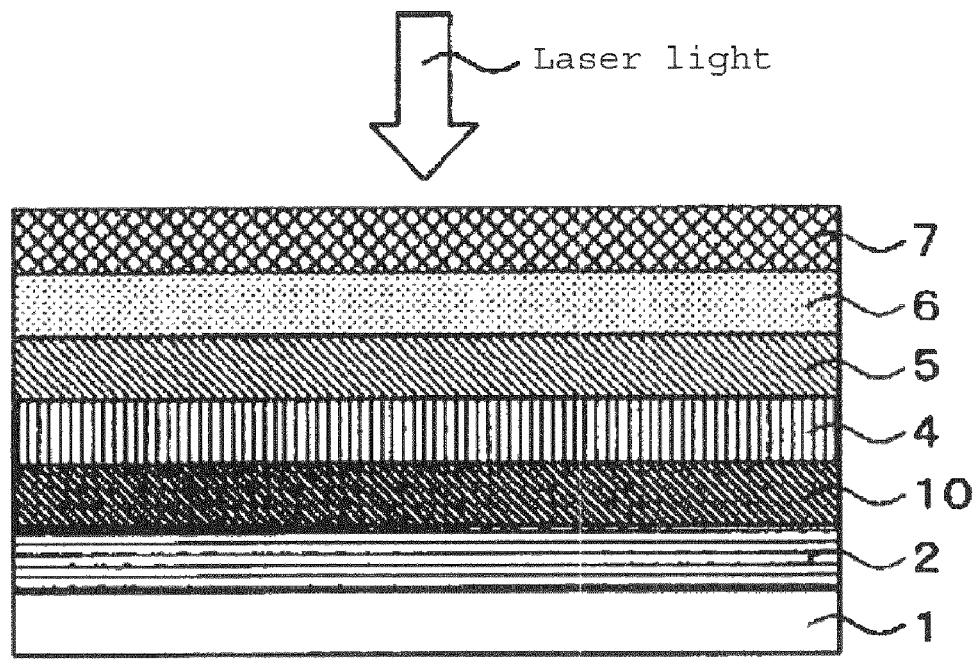
FIG. 3: An enlarged cross sectional view showing another example of the write once type optical recording medium of the present invention.

The layer construction is not necessarily limited to the construction of FIG. 1. For example, as shown in FIG. 2, it is possible to employ a layer construction in which an antidiffusion layer 8 is provided between the reflective layer 2 and the first dielectric layer 3 in the construction of FIG. 1. As an alternative, a layer construction in which an underlayer 9 is provided between the substrate and the reflective layer 2 can also be employed. As another alternative, a layer construction in which a close contact layer 10 is provided between the recording layer 4 and the first dielectric layer 3 may also be employed. Further, as shown in FIG. 3, a layer construction in which the first dielectric layer 3 is replaced by the close contact layer 10 (it is a matter of course that the second dielectric layer 5 can also be replaced by the close contact layer 10) may also be employed. Here, it is a matter of course that the above layer constructions may be appropriately combined according to a performance required.

Figure 4:
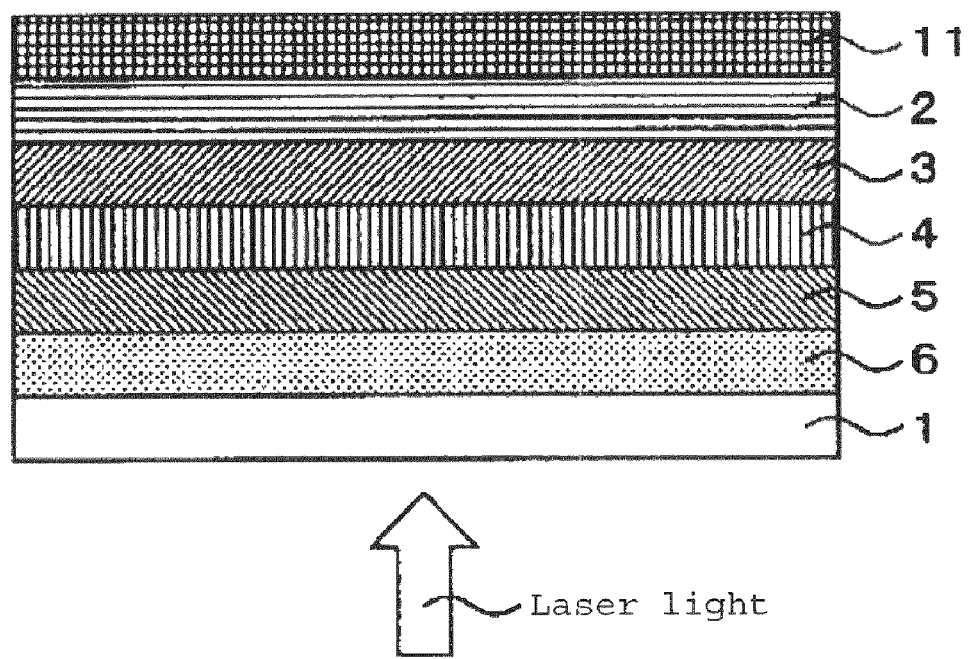
FIG. 4: An enlarged cross sectional view showing another example of the write once type optical recording medium of the present invention.

Further, a construction shown in FIG. 4 in which the layer construction on the substrate is reversed from that of FIG. 1 may be employed to construct a substrate side incident type recording medium. In this case, a protection coat layer 11 is provided on the outermost surface instead of the light transmission layer. Further, in such a substrate side incident type optical recording medium, it is a matter of course that the above antidiffusion layer 8 or the close contact layer 10 may be appropriately employed. From now, each layer will be described in detail.

(1) Substrate 1

For a substrate employed in the write once type optical recording medium of the present invention, a resin such as polycarbonate, an acryl, polyolefin; a glass; or a metal such as aluminum; may be employed. Usually, since a guide groove of about from 15 to 250 nm deep is formed on the substrate, a substrate made of resin on which such a guide groove is formed by molding is preferred. Further, in a case of so-called substrate side incidence (refer to FIG. 4) in which focused light beam for recording and reproduction is incident from the substrate side, the substrate is preferably transparent.

The thickness of such a substrate is appropriately determined according to application, and usually the lower limit is at least 0.3 mm, preferably at least 0.5 mm, and the upper limit is usually at most 3 mm, preferably at most 2 mm.

(2) Reflective Layer 2

For the reflective layer 2, besides Ag or an Ag alloy, various types of materials such as Al, Au or alloys containing these as main components, may be employed.

As the material of the reflective layer, an alloy containing Ag or Al as the main component that have high thermal conductivity and high heat radiation effect is preferably employed.

A material of reflective layer suitable for the present invention may specifically be pure Ag or a Ag alloy containing in Ag at least one type of element selected from the group consisting of Ti, V, Ta, Nb, W, Co, Cr, Si, Ge, Sn, Sc, Hf, Pd, Rh, Au, Pt, Mg, Ar, Mo, Cu, Nd, Bi and Mn. In a case where time dependent stability is important, at least one type selected from the group consisting of Ti, Mg, Au, Cu, Nd, Bi and Pd is preferably employed as an additive.

Further, another preferred example of the material of the reflective layer may be an Al alloy containing in Al at least one type of element selected from the group consisting of Ta, Ti, Co, Cr, Si, Sc, Hf, Pd, Pt, Mg, Zr, Mo and Mn. It is known that these alloys improve anti-hillock property, and thus, these alloys may be employed considering durability, volume resistivity or film-forming speed etc.

The amount of other elements contained in the above Ag or Al is usually at least 0.1 atomic %, preferably at least 0.2 atomic %. In an Al alloy, if the content of the above elements is too small, anti-hillock property becomes insufficient in many cases under specific film-forming conditions. The content of the above elements is usually at most 5 atomic %, preferably at most 2 atomic %, more preferably at most 1 atomic %. If the content is too large, the resistivity of the reflective layer may increase (thermal conductivity may decrease).

In a case of employing an Al alloy, an Al alloy containing from 0 to 2 wt % of Si, from 0.5 to 2 wt % of Mg and from 0 to 0.2 wt % of Ti may be employed. Si effects to suppress fine exfoliation defects, but if its content is too large, thermal conductivity may change with age, and thus, the content is usually at most 2 wt %, preferably at most 1.5 wt %. Further, Mg improves corrosion resistance of the reflective layer, but if its content is too large, thermal conductivity may change with age, and thus, the content is usually at most 2 wt %, preferably at most 1.5 wt %. The content of Ti is usually at most 0.2 wt %. Ti has an effect of preventing fluctuation of sputtering rate. However, if the content of Ti is too large, the thermal conductivity of the reflective layer decreases, and it becomes difficult to carry out casting of a bulk in which Ti is uniformly dissolved in micron level, and thus, the target cost tends to increase. For this reason, the content of Ti is preferably in the above range.

The thickness of the reflective layer is usually at least 40 nm, preferably at least 50 nm, and usually at most 300 nm, preferably at most 200 nm. If the film thickness is too thick, the sheet resistivity can be lowered, but sufficient heat radiation effect can not be obtained and recording sensitivity tends to be deteriorated. This is considered to be because since heat capacity per unit area increases, heat radiation of the reflective layer itself takes longer time and the heat radiation effect decreases contrarily to the expectation. Further, as the film thickness increases, it takes longer time to form the thick film, and the cost for the material tends to increase. Further, if the film thickness is too small, the effect of island-shaped structure tends to appear in the initial state of film-growth, which tends to decrease reflectivity or thermal conductivity.

The reflective layer is usually formed by a sputtering method or a vacuum vapor deposition method, wherein the total amount of impurities including the impurities derived from the target or the vapor deposition material itself as well as moisture or oxygen intermixed at the time of film-forming, is preferably less than 2 atomic %, more preferably less than 1 atomic %. For this purpose, at a time of forming the reflective layer by a sputtering method, the arrival vacuum degree of a process chamber is preferably less $1 \times 10^{-3}$ Pa.

Further, in a case of carrying out film-forming at an arrival vacuum degree poorer than $10^{-4}$ Pa, the film-forming rate is preferably set to at least 1 nm/sec, preferably at least 10 nm/sec to prevent intermixture of impurities. As an alternative, when the reflective layer contains more than 1 atomic % of intentional additive elements, the film-forming rate is preferably set to at least 10 nm/sec to prevent intermixture of additional impurities as much as possible.

It is effective to construct the reflective layer to have a multi-layer structure to obtain further high thermal conductivity and high reliability. In this case, at least one layer is preferably made of the above material having a film thickness of at least 50% of the total thickness of the reflective layer. Usually, the reflective layer is constructed so that the above layer substantially provides heat-radiation effect and other layers contribute to anticorrosion property, adhesiveness with protection layer and improvement of anti-hillock property.

(3) First Dielectric Layer 3

The first dielectric layer 3 usually plays the following three roles. Namely, they are a role of preventing heat generated at a time of recording from dispersing from the recording layer to other layers, a role of controlling the reflectivity of the optical recording medium by interference effect, and a role of barrier layer to shut off moisture in a high temperature high moisture environment.

The material forming the first dielectric layer may, for example, be an oxide of e.g. Sc, Y, Ce, La, Ti, Zr, Hf, V, Nb, Ta, Zn, Al, Cr, In, Si, Ge, Sn, Sb or Te; a nitride of e.g. Ti, Zr, Hf, V, Nb, Ta, Cr, Mo, W, Zn, B, Al, Ga, In, Si, Ge, Sn, Sb or Pb; or a carbide of Ti, Zr, Hf, V, Nb, Ta, Cr, Mo, W, Zn, B, Al, Ga, In or Si. Further, a mixture of these oxides, nitrides and carbides may be mentioned. Further, the dielectric material may, for example, be a sulfide, a selenide or a telluride of e.g. Zn, Y, Cd, Ga, In, Si, Ge, Sn, Pb, Sb or Bi; a fluoride of e.g. Mg or Ca; or a mixture of these.

Among these materials, e.g. ZnS—$SiO_2$, SiN, $Ta_2O_5$ or $Y_2O_2S$ is widely used since it has such merits as high film-forming speed, small film stress, small volume change rate by temperature change and excellent weather resistance.

The film thickness of the first dielectric layer 3 is usually at least 2 nm, preferably at least 4 nm, more preferably at least 6 nm. Meanwhile, the film thickness of the first dielectric layer 3 is usually at most 100 nm, preferably at most 80 nm. If the film thickness is in this range, the above functions can be easily obtained.

The first dielectric layer is usually formed by a sputtering method, wherein the total amount of impurities including the impurities derived from the target itself and moisture and oxygen intermixed at a time of film-forming, is preferably less than 2 atomic %. For this purpose, the arrival vacuum degree of a process chamber is preferably less than $1 \times 10^{-3}$ Pa when the first dielectric layer is formed by a sputtering method.

(4) Recording Layer 4

The recording layer employed in the present invention is required to have a property that it is decomposed by heat at a time of recording. The recording layer preferably contains a material A that is decomposed at an arrival temperature of the recording layer by heat at a time of recording; and a material B that does not undergo chemical reaction or phase change at an arrival temperature of the recording layer by heat at the time of recording.

In the present invention, the relation between the material A and the material B contained in the recording layer is preferably as follows. Namely, the material A is preferably a material having a decomposition temperature of 1,200° C. or lower, and the material B is preferably a material having no decomposition temperature nor melting point of 1,500° C. or lower.

The materials to be employed as the material A and the material B are not particularly limited so long as they satisfy predetermined properties of the present invention. Each of the material A and the material B is preferably an inorganic material since an inorganic material tends to satisfy the above properties. An inorganic material has a merit that from which a material that is decomposed by heating of the recording layer or a material that is stable without being decomposed by heating of the recording layer, is easily selected.

More specifically, the material A and the material B are each preferably a nitride or an oxide. This is because a nitride or an oxide is excellent in that it has small particle size and thus it can reduce noise of recording signal and that a material having appropriate optical coefficients (refractive index and extinction coefficient) can be selected.

Further, when the material A is a nitride and/or an oxide that discharges nitrogen gas or oxygen gas at its decomposition temperature, volume change at this time produces large deformation of the recording layer and significant optical change at the same time, which produces a large signal amplitude.

Further, when the material B is an oxide and/or a nitride (preferably having a decomposition temperature and a melting point of at least 1,500° C.) that does not undergo a chemical reaction or a phase change at an arrival temperature of the recording layer by heat at time of recording, it becomes possible to select an extremely stable material. Further, since these materials have low reactivity with other materials, it becomes possible to produce an extremely stable recording medium.

As described above, the material A and the material B are preferably each a nitride and/or an oxide. The material A may be a nitride only, an oxide only or mixture of nitride and oxide. In the same manner, the material B may be a nitride only, an oxide only or a mixture of nitride and oxide.

The material A is preferably a nitride of metal or a nitride of semiconductor that has a decomposition temperature lower than the arrival temperature (for example 1,200° C.) of the recording layer by heat at a time of recording. Such a nitride may be a nitride of an element selected from the group consisting of Cr, Mo, W, Fe, Ge, Sn and Sb. Among these, from the viewpoint of stability and low noise at a time of recording, the material A is preferably a nitride of Mo, Ge, Sn or Sb, particularly preferably a nitride of Sn or Sb.

Further, the material A may be an oxide of a metal or an oxide of a semiconductor that has a decomposition temperature lower than the arrival temperature (for example 1,200° C.) of the recording layer by heat at a time of recording. Such an oxide is preferably an oxide of an element selected from the group consisting of Ir, Au, Ag and Pt. Among these, an oxide of Au, Ag or Pt is particularly preferred from the viewpoint of stability and low noise at a time of recording.

These nitrides of metals, nitrides of semiconductors, oxides of metals and oxides of semiconductors are each discharges nitrogen or oxygen and is decomposed into a metal or semiconductor at the arrival temperature of the recording layer at a time of recording.

Meanwhile, the material B is preferably a nitride of metal or a nitride of semiconductor (preferably having no decomposition temperature nor melting point of 1,500° C. or lower) that does not undergo a chemical reaction or a phase change at an arrival temperature of the recording layer by heat at a time of recording. Such a nitride may be a nitride of an element selected from the group consisting of Ti, Zr, Hg, V, Nb, Ta, Al and Si. Among these, from the viewpoint of stability and low cost, the material B is preferably a nitride of Ti, V, Nb, Ta, Al or Si, particularly preferably a nitride of Ti, V, Nb, Ta or Si. The material B is the most preferably a nitride of V or Nb.

Further, the material B may be an oxide of metal or an oxide of semiconductor (preferably having no decomposition temperature nor melting point of 1,500° C. or lower) that does not undergo a chemical reaction or phase change at an arrival temperature of the recording layer by heat at a time of recording. Such an oxide is preferably an oxide of an element selected from the group consisting of Zn, Al, Y, Zr, Ti, Nb, Ni, Mg and Si. Among these, an oxide of Zn, Al, Y, Zr, Nb or Si is particularly preferred from the viewpoints of stability and low noise at the time of recording.

When the material A and the material B are each a nitride and/or an oxide, it is preferred that a relation $0.03 \leq$ (number of atoms of $\beta$)/((number of atoms of $\alpha$)+(number of atoms of $\beta$))$\leq 0.95$ between an element $\alpha$ that is a constituent element of the material A other than nitrogen and oxygen and an element $\beta$ that is a constituent element of the material A other than nitrogen and oxygen. Namely, the number of atoms of the element $\beta$ present in the recording layer is at least 0.03 and at most 0.95 based on the total of the number of atoms of the element $\alpha$ and the number of atoms of the element $\beta$. (Number of atoms of $\beta$)/((number of atoms of $\alpha$)+(number of atoms of $\beta$)) is preferably at least 0.03, more preferably at least 0.05. When the ratio is within this range, the effect of addition of the material B is sufficiently exhibited. Further, (number of atoms of $\beta$)/((number of atoms of $\alpha$)+(number of atoms of $\beta$)) is preferably at most 0.95, more preferably at most 0.9, further preferably at most 0.8, particularly preferably at most 0.7. When the ratio is in this range, the amplitude of recording signal becomes sufficient.

In the present invention the extinction coefficient of the recording layer is appropriately determined according to application, but the lower limit of the extinction coefficient of the recording layer is preferably at least 0.2, more preferably at least 0.3 at the wavelength of laser employed for recording and reproduction. When the lower limit is within this range, absorption of incident laser light becomes sufficient and the recording sensitivity becomes good. Further, the upper limit of the extinction coefficient is preferably at most 1.6, more preferably at most 1.4, particularly preferably at most 1.2. When the upper limit is within this range, it becomes possible to prevent insufficient reflectivity due to too high light absorption.

Here, in the present invention, measurement of extinction coefficient can be carried out by using ellipsometry together with the measurement of refractive index.

Further, the film thickness of the recording layer is appropriately determined according to application. The lower limit of the film thickness of the recording layer is usually at least 4 nm, preferably at least 6 nm. When the lower limit is within this range, absorption of incident laser light becomes high and sensitivity becomes good, and further, the amplitude of recording signal becomes sufficient. Meanwhile, the upper limit of the film thickness of the recoding layer is usually at most 30 nm, preferably at most 25 nm, more preferably at most 20 nm. When the upper limit is within this range, it becomes possible to prevent low reflectivity due to too high absorption of recording layer or to prevent lowering of the effect of incorporation of the material B (that is preferably a nitride or an oxide having no decomposition temperature nor melting point of 1,500° C. or lower) due to too large amount of gas discharge.

In the present invention, the recording layer is usually produced by a sputtering method. For example, the recording layer can be produced by a sputtering method in which small amount of Ar gas is flown in a vacuum chamber to produce a predetermined vacuum pressure environment, and a voltage is applied to a target made of the material A and a target made of the material B to produce electric discharge to form a film. Further, the recording layer may be produced by a sputtering method in which a small amount of Ar gas is flown in a vacuum chamber to produce a predetermined vacuum pressure environment and a voltage is applied to a target made of a mixture of the material A and the material B to produce electric discharge to form a film.

The material A and the material B are each a nitride or an oxide of metal or a nitride or an oxide of semiconductor, they may be produced by the following reactive sputtering method. Namely, a small amount of mixed gas Ar and $N_2$ or $O_2$ is flown in a vacuum chamber to produce a predetermined vacuum pressure environment. In this state, a voltage is applied to a target to produce electric discharge, wherein the target is made of a mixed product of a metal or a semiconductor whose nitride or oxide corresponds to the material A and a metal or a semiconductor whose nitride or oxide corresponds to the material B. As a result, a reactive sputtering takes place, wherein a complex of such metals or semiconductors driven out from the target are reacted with $N_2$ or $O_2$ to produce a nitride or an oxide to form a film. Further, without using a target made of a mixed product, the recording layer may be formed by a co-sputtering method in which a plurality of single targets are used to produce electric discharge simultaneously.

(5) Second Dielectric Layer 5 and Third Dielectric Layer 6

Properties of the second dielectric layer and the third dielectric layer employed in the present invention are as described in the above [1]. The specific material to be employed in the second dielectric layer is the same as the above (3) describing the case of the first dielectric layer. For the material of the third dielectric layer, a material having the above-mentioned predetermined properties may be selected after the material of the second dielectric layer is appropriately selected. Specifically, the material of the third dielectric layer may be selected from the materials mentioned in the case of the first dielectric layer, and is preferably an oxide of an element selected from the group consisting of Si, Y, Ce, Zr, Nb, Ta, Zn, Al, In and Sn; a nitride of an element selected from the group consisting of Si, Ge and Al; or a mixture of these, and particularly preferably Si—O—N as a mixture of an oxide and a nitride of Si.

A Si—O—N film is also usually produced by a sputtering method. For example, the film is produced by a sputtering method in which a small amount of Ar gas is flown in a vacuum chamber to produce a predetermined vacuum pressure environment, and a target made of Si—O—N is applied to a voltage to produce electric discharge to form a film.

Further, the film can also be produced by a reactive sputtering method. Namely, a small amount of a mixed gas of Ar and $N_2$ or $O_2$ is flown in a vacuum chamber produce a predetermined vacuum pressure environment. Further, a voltage is applied to a target made of Si to produce electric discharge. As a result, a reactive sputtering takes place, in which a complex of metal or semiconductor driven out from the target is reacted with $N_2$ or $O_2$ to produce a nitride or an oxide to form a film.

The composition ratio of Si—O—N is preferably within a range of $0 \leq x \leq 0.4$, $0 \leq y \leq 0.6$ and $0 \leq z \leq 1$ when the composition is represented by $(SiO_{(2-x)})_z(Si_3N_{(4-y)})_{(1-z)}$.

The film thickness of the second dielectric layer is preferably within a range of from 5 nm to 55 nm, more preferably from 10 nm to 50 nm, the most preferably from 15 nm to 45 nm. The film thickness of the third dielectric layer is preferably within a range of from 2 nm to 30 nm, more preferably from 3 nm to 25 nm, the most preferably from 4 nm to 20 nm. When the film thickness is within this range, it becomes possible to achieve good preservation stability of recording signal and good uniformity of reflectivity at the same time.

(6) Light Transmission Layer 7

The light transmission layer 7 is required to play a role of a thin incident substrate as well as that of protecting a sputtered film from moisture or dust. Accordingly, the light transmission layer 7 is preferably transparent for laser light to be employed for recording and reproduction, and at the same time, the thickness is preferably from 50 μm to 150 μm, more preferably from 80 μm to 120 μm. Further, with respect to the film thickness distribution of the light transmission layer 7, the uniformity of the thickness is preferably within 5 μm in the entire optical recording medium. The light transmission layer 7 can be usually produced by spin-coating with a UV-curable resin and curing it or by laminating a transparent sheet.

(7) Antidiffusion Layer 8

The primary purpose of the antidiffusion layer 8 is to prevent diffusion of components of the dielectric material employed for the first dielectric layer 3 into the metal reflective layer 2. For the reflective layer 2, silver or a silver alloy are widely used from the viewpoint of excellent thermal conductivity or cost. Meanwhile, for the first dielectric layer 3, ZnS—$SiO_2$ is widely used for such reasons that its film stress is small, it has excellent in thermal resistance, and its film-forming rate is high. When these reflective layer 2 and first dielectric layer 3 are provided so as to directly contact with each other as shown in FIG. 1, sulfur in ZnS—$SiO_2$ in the first dielectric layer 3 is diffused into the reflective layer 2 made of silver or a silver alloy, which may cause a problem such as lowering of reflectivity or lowering of thermal conductivity of the reflective layer. For this reason, the antidiffusion layer 8 is preferably provided as shown in FIG. 2 to prevent the above diffusion to improve preservation stability.

Accordingly, the material of the antidiffusion layer 8 is a material that is extremely stable and that is hardly diffused into a material of the reflective layer (particularly silver or a silver alloy) (namely, the material of the antidiffusion layer 8 hardly forms a compound or a solid solution with silver or a silver alloy). Further, the material of the antidiffusion layer 8 is a material having low reactivity with sulfur contained in the first dielectric layer, or a material whose sulfide is chemically stable.

The material of the antidiffusion layer 8 is preferably a material satisfying such conditions that it is hardly diffused into the reflective layer, it has good adhesiveness with the reflective layer, it prevents diffusion of the dielectric layer material into the antidiffusion layer 8, and it has good adhesiveness with the dielectric layer. So long as the material of the antidiffusion layer 8 satisfies these conditions, the material may be any one of a metal, a semiconductor, a metal oxide, a metal nitride, a metal carbide, a semiconductor oxide, a semiconductor nitride, a semiconductor carbide, a fluoride and an amorphous carbon etc., or a mixture of these. A metal or a semiconductor satisfying the above conditions may, for example, be Si, Ti, Cr, Ta, Nb, Pd, Ni, Co, Mo or W. Among these, Cr, Ta, Nb, Ni or Mo is preferred for the reason of adhesiveness and low reactivity with the reflective layer. Further, as a compound, SiN, $SiO_2$, SiC, GeN, ZnO, $Al_2O_3$, $Ta_2O_5$, TaN, $Nb_2O_5$, $ZrO_2$, a rare earth element oxide, TiN, CrN, $CaF_2$ or $MgF_2$, may, for example, be mentioned. Among these, SiN, GeN, ZnO or $Nb_2O_5$ is preferred for the reasons of adhesiveness and low reactivity with the reflective layer.

In the above, examples where the material of the antidiffusion layer 8 is a single material are described, but a mixture of these single materials may also be employed. A material containing Ge—N being a typical example may, for example, be Ge—Si—N, Ge—Sb—N, Ge—Cr—N, Ge—Al—N, Ge—Mo—N or Ge—Ti—N. Namely, such a material contains Al, B, Ba, Bi, C, Ca, Ce, Cr, Dy, Eu, Ga, In, K, La, Mo, Nb, Ni, Pb, Pd, Si, Sb, Sn, Ta, Te, Ti, V, W, Yb, Zn or Zr etc. besides Ge.

The antidiffusion layer 8 may have a single layer structure or a multilayer structure comprising at least two layers. Further, the antidiffusion layer 8 is usually formed by a sputtering method or a reactive sputtering method.

The thickness of such an antidiffusion layer 8 is appropriately determined according to application, and the lower limit is usually at least 1 nm preferably at least 2 nm, and the upper limit is at most 20 nm preferably at most 10 nm.

(8) Underlayer 9

The underlayer 9 has an effect of preventing exfoliation of the reflective layer 2 from the substrate 1. For this reason, in order to achieve a recording medium more excellent in weather resistance, the underlayer 9 is preferably provided between the substrate 1 and the reflective layer 2. As described above, the underlayer 9 is formed for the purpose of preventing exfoliation at an interface between the substrate 1 and the reflective layer 2 caused by temperature change.

The material of the underlayer 9 is not particularly limited so long as it satisfies the above objects. For example, the material of the underlayer 9 is preferably one which has good adhesiveness with the substrate 1 and the reflective layer 2, which does not corrode the reflective layer 2, and which is not diffused into the reflective layer 2 and forms a film having excellent flatness. The material of the underlayer 9 may be, so long as it satisfies the above conditions, a single material such as a metal, a semiconductor, a metal oxide, a metal nitride, a metal carbide, a semiconductor oxide, a semiconductor nitride, a semiconductor carbide, a fluoride or an amorphous carbon, or a mixture of these. A material or a semiconductor satisfying the above conditions may, for example, be Si, Ti, Cr, Ta, Nb, Pd, Ni, Co, Mo or W. Among these, Cr, Ta, Nb or Ni is preferred for the reason of adhesiveness and low reactivity with the reflective layer. Further, as a compound, SiN, SiO2, SiC, GeN, ZnO, $Al_2O_3$, $Ta_2O_5$, TaN, $Nb_2O_5$, $ZrO_2$, a rare earth element oxide, TiN, CrN, $CaF_2$ or $MgF_2$ may, for example, be mentioned. Among these, SiN, GeN, ZnO or $Nb_2O_5$ is preferred for the reason of adhesiveness and low reactivity with the reflective layer.

In the above, examples where the material of the under layer 9 is a single material are described, but a mixture of these single materials may also be employed. A material containing Ge—N being a typical example may, for example, be Ge—Si—N, Ge—Sb—N, Ge—Cr—N, Ge—Al—N, Ge—Mo—N or Ge—Ti—N. Namely, such a material contains Al, B, Ba, Bi, C, Ca, Ce, Cr, Dy, Eu, Ga, In, K, La, Mo, Nb, Ni, Pb, Pd, Si, Sb, Sn, Ta, Te, Ti, V, W, Yb, Zn or Zr etc. besides Ge.

Further, the underlayer 9 is not necessarily have a single layer structure of a single material, but it may have a multi-layer structure of a plurality of laminated materials. For example, it may have a two layer structure in which a mixed product of ZnS—$SiO_2$ and a mixed product of Ge—Ce—N are laminated on a substrate. In this construction, ZnS—$SiO_2$ is excellent in adhesiveness with the substrate and Ge—Cr—N prevents corrosion of the reflective layer made of silver or a silver alloy due to sulfur in the ZnS—$SiO_2$.

The underlayer 9 has a thickness sufficient for uniformly forming the underlayer 9 on the substrate 1, but when the thickness is too thick, production cost and production time increases and deformation of groove shape of the substrate 1 occurs. Accordingly, the film thickness is preferably from 2 nm to 20 nm, more preferably from 5 nm to 15 nm. Further, in the same manner as other layers, it is produced by a sputtering method or a reactive sputtering method.

(9) Protection Coat Layer 11

In a case of forming a write once type optical recording medium of substrate side incident type, it is preferred to provide a protection coat layer 11 on the outermost surface as shown in FIG. 4 to prevent scratches due to direct contact with air or contact with foreign object. The material of the protection coat layer 11 is not particularly limited so long as it has the above function, and it may be an organic material such as a thermoplastic resin, a thermosetting resin, an electron-beam-curable resin, a UV-curable resin, or an inorganic material such as $SiO_2$, $SiN_4$, $MgF_2$ or $SnO_2$.

The protection coat layer 11 is usually formed by a coating method such as a spin coating method or a cast method, or e.g. a sputtering method. In a case of employing a thermoplastic resin or thermosetting resin etc. for the protection coat layer 11, such a material is applied by coating as it is dissolved in an appropriate solution, and dried to form the protection coat layer 11. In a case of employing a UV-curable resin, the material is applied by coating as it is or as it is dissolved in an appropriate solution, and irradiated with UV light to be cured to form the protection coat layer 11. These materials may be employed alone or employed as a combination of at least two types. Further, the protection coat layer 11 may have a multilayer structure constituted by at least two layers. The thickness of the protection layer 11 is appropriately determined according to application, and its lower limit is usually at least 0.1 µm, preferably at least 0.5 µm, and its upper limit is usually at most 100 µm, preferably at most 50 µm.

(10) Close Contact Layer 10

A close contact layer may be provided between the recording layer 4 and the first dielectric layer 3 and/or the second dielectric layer 5. In the recording layer employed in the recording medium of the present invention, the material A is decomposed at an arrival temperature of the recording layer reaches at a time of recording, and when the material A is decomposed, the recording layer 4 and a layer in contact with the layer (the first dielectric layer 3 or the second dielectric layer 5 in FIGS. 1 to 4) are exfoliated from each other in some cases. Specifically, when a laser beam is irradiated to a write once type optical recording medium to carry out recording, the first dielectric layer 3 or the second dielectric layer 5 is exfoliated from the recording layer 4 in some cases. In such a case, it is preferred to provide a close contact layer 10 so as to contact with the recording layer 4. Further, it is preferred to provide the first dielectric layer 3 and/or the second dielectric layer 5 so as to contact with the close contact layer 10. Specifically, as shown in FIG. 2, it is preferred to provide the close contact layer 10 between the recording layer 4 and the protection layer 3, and/or between the recording layer 4 and the protection layer 5. Particularly, since exfoliation tends to occur in an interface between the recording layer 4 and a previously formed dielectric layer (the first dielectric layer 3 in FIG. 2) after carrying out recording, it is preferred to interpose a close contact layer 10 between the recording layer 4 and the first dielectric layer 3.

Further, when the material of the close contact layer is one that can be employed also as the first dielectric layer 3 or the second dielectric layer 5, it is possible to substitute the close contact layer 10 for the first dielectric layer 3 or the second dielectric layer 5. FIG. 3 shows an example of such an optical recording medium wherein the close contact layer 10 substitutes for the first dielectric layer 3.

The material of the close contact layer 10 is usually a dielectric material. Such a dielectric material may, for example, be an oxide of e.g. Sc, Y, Ce, La, Ti, Zr, Hf, V, Nb, Ta, Zn, Al, Cr, In, Si, Ge, Sn, Sb or Te; a nitride of e.g. Ti, Zr, Hf, V, Nb, Ta, Cr, Mo, W, Zn, B, Al, Ga, In, Si, Ge, Sn, Sb or Pb; or a carbide of e.g. Ti. Zr, Hf, V, Nb, Ta, Cr, Mo, W, Zn, B, Al, Ga, In or Si. Further, a mixture of the above oxide, the above nitride and the above carbide may be mentioned. Further, the dielectric material may be a sulfide, a selenide or a telluride of e.g. Zn, Y, Cd, Ga, In, Si, Ge, Sn, Pb, Sb or Bi; a fluoride of e.g. Mg or Ca; or a mixture of these.

Among these materials, from the viewpoints of heat resistance, adhesiveness between the recording layer 4 and the first dielectric layer 3 or the second dielectric layer 5, or industrial availability, a preferred material is as follows. Namely, it is an oxide of at least one element selected from the group consisting of Y, Zr, Nb, Zn, Al, Si and Sn; a nitride of Ge and/or Cr; or a carbide of Si. Of course, a mixture of the above oxide, the nitride and the carbide is also preferred. More preferred in industrial viewpoint is an oxide of Sn—Nb (it may be a mixture of Sn oxide and Nb oxide), an oxide of Zr, an oxide of Y, an oxide of Si, an oxide of Zn, an oxide of Al, a nitride of Ge, a nitride of Ge—Cr (it may be a mixture of Ge nitride and Cr nitride), or a carbide of Si. Particularly preferred is a material containing as a main component (its content in the entire close contact layer is at least 50 atomic %) at least one type selected from the group consisting of GeN, ZrO, ZnO and SiC. Further, when a mixture is employed, a particularly preferred combination from industrial viewpoint is a combination of an oxide of Zr, an oxide of Y and an oxide of Si, or a combination of an oxide of Zn and an oxide of Al.

Of course, a plurality of the above materials may be employed in an optional combination with an optional ratio.

The material to be employed for the close contact layer 10 is particularly preferably a material having higher decomposition temperature than that of the material A to be employed for the recording layer. Namely, when the material to be employed for the close contact layer 10 has a decomposition temperature lower than the decomposition temperature of the material A, partial decomposition of the material of the close contact layer 10 occurs at a room temperature and the preservation stability of a write once type optical recording medium tends to decrease. Further, if the material contained in the close contact layer is decomposed before or simultaneously with decomposition of the material A at an arrival temperature of the recording layer at a time of recording, a desired recording state may not be obtained. As a measure to solve this problem, the material employed for the close contact layer 10 has to be a material having relatively higher decomposition temperature than that of the material A employed for the recording layer. For example, in a case of employing a Sn nitride (its decomposition temperature is about 340° C.) as the material A, the material of the close contact layer 10 may be a Ge nitride (its decomposition temperature is about 700° C.) or a Cr nitride (its decomposition temperature is about 1,080° C.) that may be also be commonly employed as the material A.

The content of the above material in the close contact layer 10 is usually at least 50 wt %, preferably at least 60 wt %, more preferably at least 70 wt %, further preferably at least 80 wt %, particularly preferably at least 90 wt %, the most preferably at least 95 wt %. From the viewpoint of adhesiveness between the recording layer 4 and the first dielectric layer 3 or the second dielectric layer 5, the content of the above material is preferably high, but since impurities (e.g. oxygen) are inevitably contained in the close contact layer at a time of forming the film, the upper limit of the above material is usually about 99.9 wt %.

The film thickness of the close contact layer 10 is usually at least 1 nm, preferably at least 2 nm, more preferably at least 3 nm, and it is usually at most 50 nm, preferably at most 30 nm, more preferably at most 20 nm. When the film thickness is within the above range, it is possible to satisfactorily obtain the adhesiveness between the recording layer 4 and the first dielectric layer 3 or the second dielectric layer 5, and to sufficiently obtain the transmittance of the recording layer for laser beam.

The method for forming the close contact layer 10 may be a known sputtering method. Specifically, the close contact layer 10 may be formed by a sputtering method in which a slight amount of Ar gas is flown in a vacuum chamber to produce a predetermined vacuum pressure environment, and a voltage is applied to a target made of a predetermined material to be contained in the close contact layer, to generate discharge to form the film.

Further, when the close contact layer 10 is made of an oxide, a nitride and an oxynitride, it is possible to use a reactive sputtering method as described below. Namely, a mixed gas of small amount of Ar, $N_2$ and/or $O_2$ is flown in a vacuum chamber to produce a predetermined vacuum pressure environment. Then, a voltage is applied to a target made of a predetermined material to generate discharge. Then, a single element or a composite of a plurality of elements driven out from the target are made to react with $N_2$ and/or $O_2$ to form a nitride, an oxide and an oxynitride to form a film. When the above reactive sputtering is employed, it becomes possible to change the $N_2$ partial pressure and/or the $O_2$ partial pressure in the mixed gas of Ar, $N_2$ and/or $O_2$ flown in the vacuum chamber (specifically, the ratio of the flow rate of $N_2$ and/or $O_2$ mixed gas based on the flow rate of total mixed gas of Ar, $N_2$ and/$O_2$) to change the amounts of nitrization and oxidation.

Here, the present invention is not limited to the above embodiments. The above embodiments are examples, and any embodiments are included in the scope of the present invention so long as it has substantially the same construction as that of the technical concept described in the claims of the present invention and it produces equivalent functions and effects.

EXAMPLES

The present invention is more specifically described with reference to the Examples below, but the present invention is not construed as limited to these Examples.

Example 1

As an example of an embodiment of the present invention, an optical recording medium having the construction shown in FIG. 2 was produced. As a substrate 1, a disk-shaped polycarbonate resin of 1.1 mm thick and 120 mm in diameter was employed. Nb was employed for an underlayer 9 and an antidiffusion layer 8, an alloy of Ag—Bi—Nd was employed for a reflective layer 2, a mixed product of ZnS—$SiO_2$ was employed for a first dielectric layer 3 and a second dielectric layer 5, a nitride constituted by Sn—Nb—N was employed for a recording layer 4, Ge—N was employed for a close contact layer 10, and Si—O—N was employed for a third dielectric layer 6. A light transmission layer 7 was produced by dropping 2.5 g of a non-cured (non-polymerized) acrylic acid ester type UV-curing agent, on the central portion of the substrate, spraying it by rotating the substrate at 1,500 rpm for 6 sec, and irradiating it with UV rays to cure (polymerize) the UV curing agent. The film thickness of the light transmission layer was made to be within a range of from 97 to 103 μm.

A sputtering method was employed for producing multilayer films other than the substrate 1 and the light transmission layer 7. As the apparatus for sputtering method, a DVD-SPRINTER manufactured by UNAXIS Corporation was employed, and the film-forming conditions and film thicknesses of these layers were set shown in Table 1.

TABLE 1

| | Target | Sputtering power | Sputtering gas | Film thickness |
|---|---|---|---|---|
| Underlayer | Nb | RF 1.0 kW | Ar 25 sccm | 3 nm |
| Reflective layer | Ag96.5Bi0.5Nd3 (atomic %) | DC 3.0 kW | Ar 25 sccm | 80 nm |
| Antidiffusion layer | Ge80Cr20 (atomic %) | RF 1.2 kW | Ar 50 sccm $N_2$ 30 sccm | 3 nm |
| First dielectric layer | $(ZnS)_{80}(SiO_2)_{20}$ (mol %) | RF 2.4 kW | Ar 10 sccm | 21 nm |
| Close contact layer | Ge | RF 2.0 kW | Ar 50 sccm $N_2$ 9 sccm | 5 nm |
| Recording layer | Sn60Nb40 | RF 3.0 kW | Ar 40 sccm $N_2$ 30 sccm | 15 nm |
| Second dielectric layer | $(ZnS)_{80}(SiO_2)_{20}$ (mol %) | RF 2.0 kW | Ar 10 sccm | 30 nm |
| Third dielectric layer | Si | DC 2.0 kW | Ar 50 sccm $N_2$ 36 sccm $O_2$ 4 sccm | 5 nm |

With respect to the second dielectric layer ZnS—$SiO_2$ and the third dielectric layer Si—O—N, the hardnesses were measured by nano-indentation method, and as a result, they were 5.2 GPa and 13.8 GPa respectively. Further, with respect to the second dielectric layer ZnS—$SiO_2$, the third dielectric layer Si—O—N and the light transmission layer 7, the refractive indexes at wavelength 405 nm were measured by using an ellipsometer, and as a result, they were 2.3, 1.8 and 1.5 respectively.

Example 2

An optical recording medium of Example 2 was prepared, which has the same construction as that of Example 1 except that the film thickness of the third dielectric layer Si—O—N was 10 nm.

Comparative Example 1

An optical recording medium of Comparative Example 1 was prepared, which has the same construction as that of Example 1 except that the third dielectric layer Si—O—N was not provided.

Comparative Example 2

An optical recording medium of Comparative Example 2 was prepared, which has the same construction as that of Comparative Example 1 except that the film thickness of the second dielectric layer ZnS—SiO$_2$ was 35 nm to conduct further detailed comparison.

Evaluation

With respect to each of the optical recording mediums of Example 1 and 2 and Comparative Examples 1 and 2, uniformity of reflectivity in the entire medium and preservation stability of recording signal were evaluated.

In the evaluation of uniformity of reflectivity in entire medium, an evaluation instrument having a light source wavelength of 405 nm and having a numerical aperture of 0.85 was employed to measure the average reflectivity along a circle at a radial position of each of radiuses of 24 mm, 40 mm, 55 mm, 57 mm, 58 mm and 58.3 mm, and the ratio between the maximum and the minimum of these average reflectivities was obtained.

In the evaluation of preservation stability of recording signal, the same evaluation instruments having a light source wavelength of 405 nm and a numerical aperture of 0.85 was employed to record a random signal under the conditions of linear speed 4.92 m/sec., RLL1-7 modulation and channel clock 66 MHz; and the preservation stability of the recording portion was measured.

First of all, while the recording power was changed, recording and jitter measurement was carried out, to obtain an optimum recording power minimizing the jitter. Then, recorded regions were prepared at recording powers of 85%, 90%, 95%, 100%, 105%, 110% and 115% based on the optimum power.

Thereafter, the recording medium was preserved in an environment of 80° C./80% Rh for 100 hours. Then, jitters in the recorded regions of the respective recorded powers were measured before and after the environmental test.

Here, in the measurement of jitter, waveform equalization of record signal was carried out by a limit equalizer, the waveform was digitized and distributions of time differences from a rising edge and a falling edge of the digitized signal to a rising edge of a cyclic signal, respectively, were measured by a time interval analyzer (data to clock jitter). Table 2 shows the evaluation results.

TABLE 2

|  |  | Reflectivity ratio | Jitter |  |  |  |  |  |  |
|---|---|---|---|---|---|---|---|---|---|
|  |  |  | 85% | 90% | 95% | 100% | 105% | 110% | 115% |
| Ex. 1 | Before environmental test | 1.09 | 7.3% | 5.4% | 4.9% | 4.5% | 5.0% | 6.1% | 6.5% |
|  | After environmental test | — | 7.5% | 5.5% | 5.0% | 4.6% | 4.9% | 6.1% | 8.5% |
| Ex. 2 | Before environmental test | 1.11 | 7.5% | 6.2% | 4.8% | 4.7% | 5.0% | 6.1% | 7.4% |
|  | After environmental test | — | 7.7% | 6.3% | 4.8% | 4.5% | 4.7% | 6.2% | 7.2% |
| Comp. Ex. 1 | Before environmental test | 1.08 | 8.2% | 6.2% | 5.5% | 5.3% | 5.6% | 6.4% | 7.9% |
|  | After environmental test | — | 8.3% | 6.4% | x | x | x | x | x |
| Comp. Ex. 2 | Before environmental test | 1.14 | 9.0% | 7.0% | 5.8% | 5.5% | 5.9% | 7.0% | 8.1% |
|  | After environmental test | — | 9.2% | 7.1% | 6.0% | x | x | x | x |

* x indicates that measurement was impossible due to exfoliation of recorded portion.

In terms of the reflectivity of uniformity, Comparative Example 1 is the best since the ratio of the maximum reflectivity to the minimum reflectivity is 1.08, but in Examples 1 and 2 having constructions in which Si—O—N of 5 nm and 10 nm, respectively, were added to the construction of Comparative Example 1, the reflectivity ratio were 1.09 and 1.11 respectively and the reflectivity ratio were not significantly deteriorated. On the other hand, in Comparative Example 2 having a construction in which the film thickness of the ZnS—SiO$_2$ film is increased by 5 nm from that of Comparative Example 1, the reflectivity was 1.14 and it was significantly deteriorated.

Meanwhile, in terms of preservation stability of recorded region, jitter was deteriorated by 2% in a region in which recording was made at a recording power of 115% of optimum recording power, but change of jitter was within 0.3% in other recorded regions, and it was very slight. Further, in Example 2, change of jitter was within 0.3% and was good in all recorded regions. On the other hand, in Comparative Example 1, jitter was not measurable due to exfoliation in all regions in which recording was made at a recording power of at least 95% of the optimum power. Also in Comparative Example 2, jitter was not measurable due to exfoliation in all regions in which recording was made at least at the optimum recording power.

From the above results, it has become clear that by providing the first dielectric layer having high hardness and low refractive index and made of Si—O—N, it is possible to improve preservation stability without deteriorating uniformity of reflectivity.

INDUSTRIAL APPLICABILITY

A recording medium having the layer structure of the present invention is a write once type optical recording medium required to achieve higher density recording than conventional write once type optical recording medium, which can achieve both of excellent preservation resistance and good recording signal property, and thus, which is widely usable.

The entire disclosure of Japanese Patent Application No. 2006-166970 filed on Jun. 16, 2006 including specification, claims, drawings and summary is incorporated herein by reference in its entirety.

The invention claimed is:

1. An optical recording medium comprising a substrate and a reflective layer, a first dielectric layer, a recording layer, a second dielectric layer and a light-transmission layer formed in this order on the substrate,
   wherein the recording layer is decomposable by heat at a time of recording to achieve recording of the optical recording medium,
   wherein the optical recording medium further comprises a third dielectric layer between the second dielectric layer and the light-transmission layer, and
   wherein the recording layer comprises a material A that decomposes at an arrival temperature of the recording layer by heat at a time of recording; and a material B that undergoes a chemical reaction at the arrival temperature of the recording layer by heat at the time of recording,
   wherein the third dielectric layer has a hardness greater than the hardness of the second dielectric layer.

2. The optical recording medium according to claim 1, wherein the refractive index of the third dielectric layer is lower than the refractive index of the second dielectric layer at a wavelength of light used for optical recording.

3. The optical recording medium according to claim 1, wherein the third dielectric layer comprises an oxide of at least one element selected from the group consisting of Si, Y, Ce, Zr, Nb, Ta, Zn, Al, In and Sn; a nitride of at least one element selected from the group consisting of Si, Ge and Al; or a mixture thereof.

4. The optical recording medium according to claim 1, wherein the third dielectric layer comprises a mixture of an oxide of Si and a nitride of Si.

5. The optical recording medium according to claim 1, wherein the hardness of the third dielectric layer is at least 8 GPa according to a nano-indentation method.

6. The optical recording medium according to claim 1, wherein the difference between the refractive index of the third dielectric layer and the refractive index of the light-transmission layer is at most 0.5 at a wavelength of light used for optical recording.

7. The optical recording medium according to claim 1, which further comprises at least one layer selected from the group consisting of an antidiffusion layer, an underlayer, a protection coat layer, and a close contact layer.

8. The optical recording medium according to claim 7, wherein the close contact layer is used as the first dielectric layer or the second dielectric layer.

9. The optical recording medium according to claim 1, wherein each of the material A and the material B independently is at least one nitride, at least one oxide, or a mixture thereof.

10. The optical recording medium according to claim 1, wherein the material A is an oxide of a metal or an oxide of a semiconductor.

11. The optical recording medium according to claim 1, wherein the material A is an oxide of at least one element selected from the group consisting of Ir, Au, Ag, and Pt.

12. The optical recording medium according to claim 1, wherein the material A is a nitride of a metal or a nitride of a semiconductor.

13. The optical recording medium according to claim 1, wherein the material A is a nitride of at least one element selected from the group consisting of Cr, Mo, W, Fe, Ge, and Sn.

14. The optical recording medium according to claim 1, wherein the material B is a nitride of a metal or a nitride of a semiconductor.

15. The optical recording medium according to claim 1, wherein the material B is a nitride of at least one element selected from the group consisting of Ti, Zr, Hg, V, Nb, Ta, Al, and Si.

16. The optical recording medium according to claim 1, wherein the material B is an oxide of a metal or an oxide of a semiconductor.

17. The optical recording medium according to claim 1, wherein the material B is an oxide of at least one element selected from the group consisting of Zn, Al, Y, Zr, Ti, Nb, Ni, Mg, and Si.

* * * * *